July 14, 1959  G. A. LYON  2,894,786
WHEEL STRUCTURE
Filed June 8, 1955
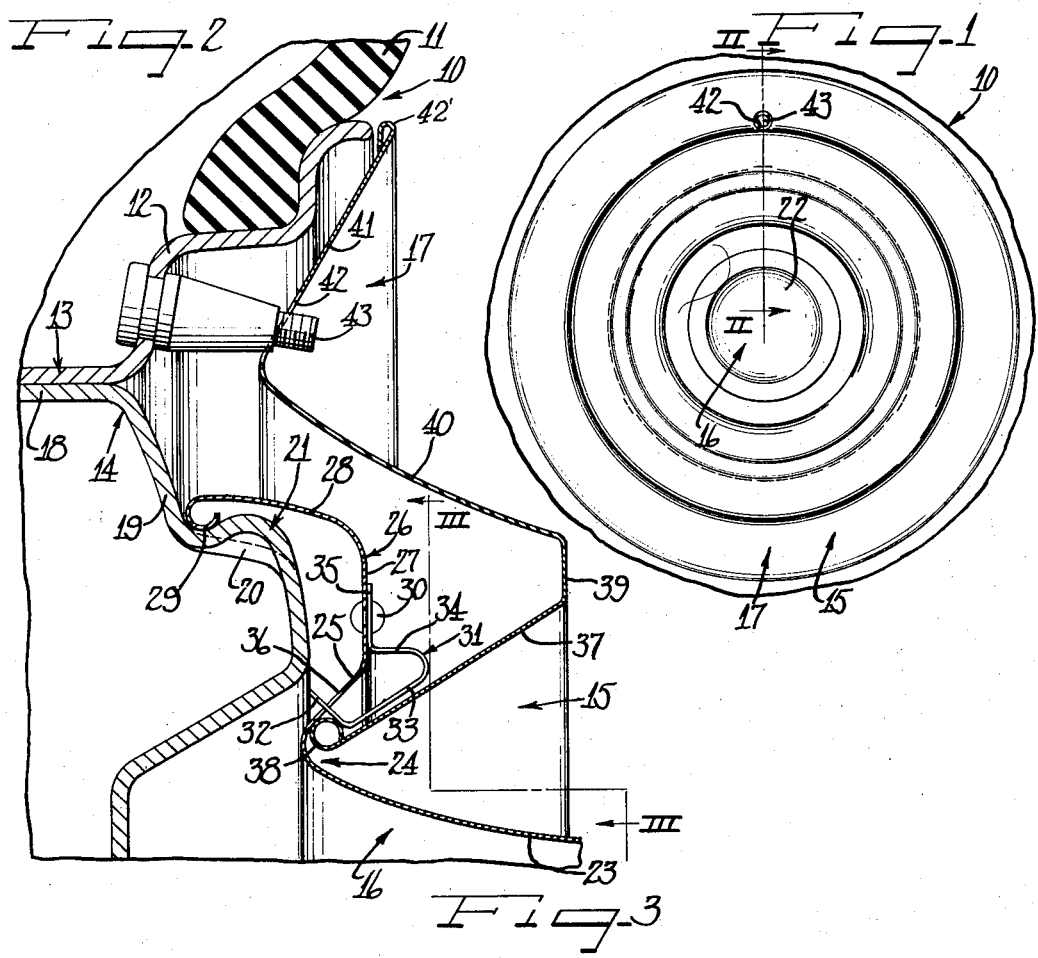
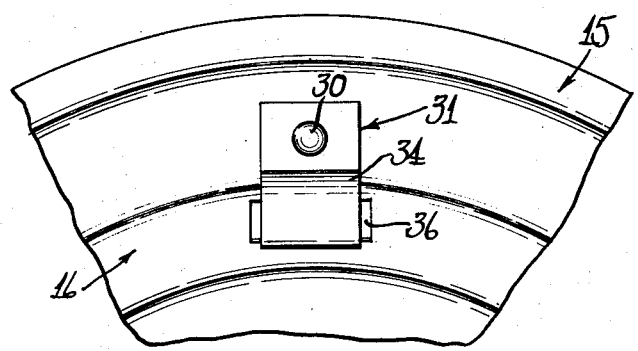
Inventor
George Albert Lyon United States Patent Office
2,894,786
Patented July 14, 1959

2,894,786

WHEEL STRUCTURE

George Albert Lyon, Detroit, Mich.

Application June 8, 1955, Serial No. 513,951

8 Claims. (Cl. 301—37)

The present invention relates to improvement in wheel structures and more particularly concerns the ornamental covering and its mode of attachment to the outer side of a vehicle wheel.

An important object of the present invention is to provide a wheel structure including a novel cover for the outer side thereof enabling the provision of a relatively deep double draw section.

It will be appreciated that there are limitations upon the depth to which sheet metal may be drawn without overstretching and rupturing of the metal. Accordingly where there is a demand for a cover structure of such a configuration where overstretching and rupturing of the material may occur, resort may have to be had to making the cover into two separable parts instead of making it as a one-piece unit.

An object of this invention is to provide novel retaining means for maintaining a two-part cover on a wheel.

Another object of this invention is to provide a novel two-part cover including an inner cover member and a trim ring.

Still another object of this invention is to provide a two-part cover structure of such construction that it is capable of hiding the necessary retaining means and the junction of the tire rim and wheel body members.

A further object of this invention is to provide an improved cover construction for vehicle wheels in which the cover has a fairly massive appearance possessing highly ornamental qualities.

A still further object of this invention is to provide a new and improved cover structure which lends itself to economical production on a large scale basis.

Other objects, features and advantages of the present invention will be readily apparent from the following detail description taken in conjunction with the accompanying drawing illustrating a single embodiment, in which:

Figure 1 is a fragmentary side elevational view of a vehicle wheel structure embodying features of the invention;

Figure 2 is an enlarged fragmentary cross sectional view taken substantially on the line II—II of Fig. 1; and Figure 3 is an enlarged fragmentary view taken substantially on the line III—III of Fig. 2, showing in further detail my novel retaining clips.

The reference numeral 10 indicates generally a wheel assembly which includes a conventional tire 11 mounted on a conventional multi-flanged rim flange 12 which is suitably connected at 13 to a body part or spider 14.

Carried on the outer side of the wheel is my novel cover 15 which includes an inner cover member 16 and an outer trim ring member 17 which is adapted to overlie a portion of the inner cover, the junction of the rim and body parts and the outer marign of the rim flange 12.

The wheel body part 14 is especially constructed in order to be capable of receiving the inner cover member 16 in snap-on pry-off relation constituting the sole connection between the wheel and the cover 15. To this end the body part is of a stepped construction and includes an outer axial flange 18 which is connected to a radial inwardly projecting flange 19 which is in turn connected to an axially outwardly projecting flange 20. The axial flange 20 has formed thereon a plurality of circumferentially spaced cover retaining shouldered bumps 21 which are adapted to cooperate in retaining the wheel cover 15 on the wheel and in fact constitute the sole connection in assembly between the wheel and the cover 15.

The inner cover member 16 includes a relatively small crown portion or area 22 (Fig. 1), an annular generally axially inwardly extending side wall 23 merging into an annular axially inset channel 24. Connected to the axially extending side wall 23 is a generally radially and axially outwardly extending annular flange 25 which is in turn connected to an outer annular marginal flange portion 26 of the cover member 16.

The outer marginal flange portion 26 is looped or bulged in cross section and includes a generally radially extending flange 27 connected to a generally axially extending flange 28 terminating in a curled under annular cushioning bead 29. The looped or bulged configuration of the marginal flange portion 26 permits the radial flange 27 to be maintained in axial spaced relationship when the cover 15 is on the wheel. In so doing the trim retaining means hereafter discussed will not be hampered by the wheel. The annular axial flange 28 is comparatively resilient in character and of a slightly smaller diameter than the diameter of the bumps which permits the cushioning bead 29 to be resiliently tensioned in snap-on snap-off relation behind the shouldered bumps 21.

In view of the foregoing, it will now be apparent that as the inner cover member 16 is urged axially inwardly, flange 28 of the outer margin 25 is progressively cammed and flexed over the shoulder bump 21 and the annular cushioning pry-off bead 29 is bottomed in and behind a retaining shoulder defined on its axially inner side by the inner side of bumps 21 on spider 14.

Suitably riveted at 30 on the margin 26 of the cover member 16 are a plurality of shouldered circumferentially spaced goose-neck retaining spring clips 31.

Clips 31 each comprise a radially inwardly and axially outwardly extending leg 32 defining a shoulder which is connected to a radially and axially outwardly extending relatively long lead-in or camming leg 33 which is in turn secured to an axial leg 34 and a terminal leg 35 which is connected by the rivet 30 to flange 27.

Each of the clips is so constructed as to be inclined radially and axially inwardly so that when they are mounted on the cover the free leg 32 projects into the annular inset channel 24 on the inner cover member 16.

Provided on the radially and axially outwardly extending flange 25 are a plurality of clearance openings or slots 36. Flange 32 of spring clip 31 is adapted to extend through the clearance opening 36 in the inner side wall the ends of which defining the opening serve as stops not only against turning of the clip but in addition, the radially inner side defining the opening avoids undue radially inward flexure of the clip 31.

Trim ring 17 includes a radially and axially outwardly extending annular flange 37 which has on its inner end a cushioning gripping annular bead extremity 38. The other end of flange 37 terminates in a radially extending rib 39 which is in turn connected to relatively deeply axially inwardly and outwardly projecting diverging annular flanges 40 and 41 defining a relatively deep outer axial draw. Flange 40 projects axially inwardly and radially outwardly and is connected to flange 41 which projects radially and axially outwardly from the junction thereof and terminates in a pry-off bead 42'.

Suitably extending through flange 41 is an opening or slot 42 through which is adapted to project the valve stem 43 which is mounted on the rim flange 12.

In view of the foregoing description it is now apparent that the outer annular trim member 17 is of a relatively large construction and is adapted not only to cover the juncture of the wheel parts but also the trim retaining means and the connection between the inner member 16 and the wheel. The annular flange 37 of the trim 17 and the annular flange 23 of the inner cover member 16 define together the second relatively deep axial draw. By reason that the trim 17 is bottomed in retaining engagement in the axially inset channel 24 the cover gives an outward appearance of being a one piece cover. In so doing a cover having double relatively deep axial draws is accordingly provided.

Mounting of the trim member 17 on the inner cover member 16 may be effected by pressing axially inwardly the trim 17 against member 16. In so doing the relatively stiff beaded terminal 38 progressively cams the deflectable lead-in leg 33 of clip 31 inwardly and eventually snaps over and into bottomed engagement with the leg 32 which is substantially at right angles to the leg 33. It will be appreciated that the leg 32 and the radially inner area of flange 25 define together a retaining shoulder in which the bead is adapted to bottomingly reside in.

Removal of the outer trim member 17 may be effected by the insertion of a pry-off tool between the rim flange and the outer margin of the cover member 17 upon a slight twisting movement of the tool (not shown).

It will be understood that modifications and variations may be effected without departing from the scope of the novel concepts of the present invention.

I claim as my invention:

1. In a wheel structure including rim and body parts with said body part having cover retaining means thereon, an inner cover member having a relatively deep annular axially inwardly extending side wall merging into an outer marginal portion defining together an axially inset channel and having a terminal for snap-on-off engagement with the cover retaining means on said body part, spring clip means on said inner cover member extended into the axially inset channel, and an outer cover member having a relatively deep annular axially inwardly extending side wall spaced radially of said side wall on the inner cover member defining a gap and with said side wall on the outer cover member having a terminal for bottomed retaining engagement with said clips in said axially inset channel with the gap providing an accessible area for a pry-off tool.

2. In a wheel structure, a wheel having a body part with an annular bulged portion, an inner cover member including radially inner and outer diverging flanges defining together an axial inset channel, an outer cover member having an axially projecting side wall having a beaded terminal to be projected in to said channel in radial spaced relation to said inner flange, spring clips on said inner cover having a deflectable lead-in leg projecting into said channel and an angled terminal leg, said angled terminal leg and said outer diverging flange defining a recess in which said beaded terminal will reside in assembly, said radially outer diverging flange being connected to an inner cover margin in detachable cover retaining engagement with said bulged portion.

3. In a wheel structure including tire rim and body parts with the body part having a bulged portion provided with annularly arranged cover retaining shoulder means on the radially outer side thereof, a dished inner cover member for disposition on the outer side of the wheel in snap-on pry-off relation with said cover retaining shoulder means including an axially inset portion, said inner cover member having retaining clips extending into said inset portion, and an outer annular cover member having an inner marginal portion retainingly engageable behind said retaining clips in said inset portion on the radially inner side of the bulged portion.

4. In a wheel structure including rim and body parts with said body part having cover retaining means thereon, an inner cover member having a relatively deep annular axially inwardly extending side wall merging into an outer marginal portion defining together an axially inset channel and having a terminal for snap on-off engagement with the cover retaining means, spring clip means on said inner cover member adjacent to the axially inset channel, and an outer cover member overlying the junction of said inner cover member with said body part and having diverging cover portions defining a relatively deep axial draw and a relatively deep annular axially inwardly extending side wall on said cover member for bottomed retaining engagement with said clip means in said axially inset channel, said side walls together defining a second relatively deep axial draw, one of said inner marginal portion and said clip means being relatively resilient while the other being relatively stiff to effect a firm detachable connection between same.

5. In a wheel structure, a wheel including rim and body parts with the body part having an annular bulged portion, a wheel cover assembly including inner and outer cover members for overlying protective retained disposition upon the wheel, said inner cover member having an outer marginal portion in detachable retained assembly with the bulged portion and an annular seat disposed generally radially inwardly thereof with circumferentially spaced spring clips on said inner cover member adjacent and extending into said seat, and an outer cover member overlying a portion of said inner cover member and having an inner margin in detachable assembly behind said clips.

6. In a wheel structure, a wheel including rim and body parts with the body part having an annular bulged portion, a wheel cover assembly including inner and outer cover members for overlying protective retained disposition upon the wheel, said inner cover member having an outer marginal portion in detachable retained assembly with the bulged portion and an annular seat disposed generally radially inwardly thereof with circumferentially spaced spring clips on said inner cover member adjacent and extending into said seat, and an outer cover member overlying a portion of said inner cover member and having an inner margin in detachable assembly behind said clips, said outer cover member having an annular rib disposed generally axially outwardly overlying the junction of said inner cover member with said annular bulged portion and rigidifying said inner margin in its engagement with said clips.

7. In a wheel structure, a wheel including rim and body parts with the body part having an annular bulged portion, a wheel cover assembly including inner and outer cover members for overlying protective retained disposition upon the wheel, said inner cover member having an outer marginal portion in detachable retained assembly with the bulged portion and an annular seat disposed generally radially inwardly thereof with circumferentially spaced spring clips on said inner cover member adjacent and extending into said seat, and an outer cover member overlying a portion of said inner cover member and having an inner margin in detachable assembly behind said clips, said seat being defined on one side by a generally radially inwardly axially outwardly extending portion in radially spaced diverging relation to said inner margin of said outer cover member to provide a gap between the cover members for receipt of a pry-off tool to remove the outer cover member from the inner cover member.

8. In a wheel structure including tire rim and body parts with the body part having an annular bulged area with a bump area carried on the radially outer side of the annular bulged area, an inner cover member having an annular dished area disposed generally at the radially inner side of the bulged area with said annular dished area having circumferentially spaced resiliently deflectable clip structure mounted on the cover member extended into the annular dished area and said inner cover member including an annular marginal area disposed radially outwardly of the annular dished area which extends generally radially and then axially terminating in a resiliently deflectable marginal body part gripping area in self-retaining assembly with the bump area, and an outer cover ring member overlying the annular bulged area and having a radially inner annular relatively stiff marginal area retainingly engaged in said annular dished area behind said resiliently deflectable clip structure in assembly with the inner cover member and the body part.

References Cited in the file of this patent

UNITED STATES PATENTS

| | | |
|---|---|---|
| 2,544,703 | Lyon | Mar. 13, 1951 |
| 2,600,412 | Lyon | June 17, 1952 |